(12) United States Patent
Patti et al.

(10) Patent No.: US 6,456,148 B2
(45) Date of Patent: Sep. 24, 2002

(54) CIRCUIT AND METHOD FOR WRITING TO A MEMORY DISK

(75) Inventors: Giuseppe Patti, San Jose; Roberto Alini, Pleasanton; Gilles P. DeNoyer, Campbell, all of CA (US)

(73) Assignee: STMicroelectronics, Inc., Carrollton, TX (US)

( * ) Notice: Subject to any disclaimer, the term of this patent is extended or adjusted under 35 U.S.C. 154(b) by 0 days.

(21) Appl. No.: 09/839,511

(22) Filed: Apr. 20, 2001

Related U.S. Application Data (62) Division of application No. 09/393,058, filed on Sep. 9, 1999, now Pat. No. 6,252,450.

(51) Int. Cl.$^7$ .............................................. H03K 17/56
(52) U.S. Cl. ................................................... 327/424
(58) Field of Search ................................. 327/108, 109, 327/110, 111, 112, 423, 424, 588; 360/46, 67, 68, 112

(56) References Cited

U.S. PATENT DOCUMENTS

| | | | |
|---|---|---|---|
| 4,551,772 A | 11/1985 | Sliger | 362/46 |
| 4,937,802 A | 6/1990 | Omori et al. | 369/13 |
| 5,041,773 A | 8/1991 | Takahashi | 318/696 |
| 5,378,943 A * | 1/1995 | Dennard | 326/68 |
| 5,751,179 A * | 5/1998 | Pietruszynski et al. | 327/379 |
| 5,892,371 A * | 4/1999 | Maley | 326/81 |
| 5,926,056 A * | 7/1999 | Morris et al. | 327/333 |
| 6,018,257 A * | 1/2000 | Hung et al. | 327/112 |
| 6,052,017 A | 4/2000 | Pidutti et al. | 327/424 |
| 6,054,888 A * | 4/2000 | Maley | 327/333 |
| 6,081,152 A * | 6/2000 | Maley | 327/320 |
| 6,121,800 A | 9/2000 | Leighton et al. | 327/110 |
| 6,201,421 B1 | 3/2001 | Takeuchi et al. | 327/110 |
| 6,236,246 B1 * | 5/2001 | Leighton et al. | 327/110 |

OTHER PUBLICATIONS

U.S. application No. 09/651,830, Alini et al., filed Aug. 30, 2000.
U.S. application No. 09/651,561, Alini, filed Aug. 30, 2000.
U.S. application No. 09/991,557, Venca et al. filed Nov. 9, 2001.

* cited by examiner

*Primary Examiner*—Jeffrey Zweizig
(74) *Attorney, Agent, or Firm*—Lisa K. Jorgenson; Andre Szuwalski (57) ABSTRACT

A method and circuit are disclosed for controlling the write head of a magnetic disk storage device. The circuit includes a pull-up device coupled to a terminal of the write head, for selectively providing a current to the write head though the write head terminal. The circuit further includes parallel-connected current sink circuits, each of which is coupled to the write head terminal and selectively activated to draw current from the write head via the write head terminal. A first transistor is connected in series between the pull-up device and the write head terminal and biased to provide a voltage differential between the write head terminal and the pull-up device. A second transistor is connected in series between the write head terminal and the current sink circuits and biased to provide a voltage differential between the write head terminal and the current sink circuits.

12 Claims, 7 Drawing Sheets

CIRCUIT AND METHOD FOR WRITING TO A MEMORY DISK

This application is a divisional application of U.S. patent application Ser. No. 09/393,058, now U.S. Pat. No. 6,252, 450 filed on Sep. 9, 1999.

BACKGROUND OF THE INVENTION

Technical Field of the Invention

The present invention relates to circuit and method for writing to a memory disk, and particularly to a circuit and method for driving the write head of a disk drive device.

Background of the Invention

Most computer systems include one or more associated disk drives, which may be built into or external to the computer system. Typically, disk drives have at least one rotating magnetic medium and associated head mechanisms that are carried adjacent the magnetic material. The heads are radially positionable to selectively write information to, or read information from, precise positions on the disk medium. Such disk drives may be, for example, hard disk drives, floppy drives, or the like.

Data is written to the associated data disk by applying a series of signals to a write head according to the digital information to be stored on the magnetic disk media. The write head has a coil and one or more associated pole pieces that are located in close proximity to the disk media. As signals cause the magnetic flux to change in the head, the magnetic domains of the magnetic media of the disk are aligned in predetermined directions for subsequent read operations. Typically, a small space of unaligned magnetic media separates each magnetic domain transition to enable successive transitions on the magnetic media to be distinguished from each other.

Since the disk is moving relative to the head, it can be seen that if the small space separating the magnetic domain transitions is not sufficiently wide, difficulty may be encountered in distinguishing successive magnetic transitions. This may result in errors in reading the data contained on the disk, which is, of course, undesirable.

Meanwhile, as computers are becoming faster, it is becoming increasingly important to increase the speed at which data can be written to and read from the disk media. However, since the data signals are in the form of square wave transitions, if the rise time of the leading edges of the square waves is large, the small space between magnetic media transitions also becomes large, which reduces the effective rate at which data can be accurately written and read. Since the write head assembly includes at least one coil, forcing the current to rise rapidly, or to reverse flux directions within the write head is difficult.

In the past, data writing circuits used to supply such write signals to the heads included preamplifier circuits to drive the current through selected legs of an "H-bridge" circuit, which is capable of allowing relatively fast current reversals for accurate data reproduction.

Figure 1:
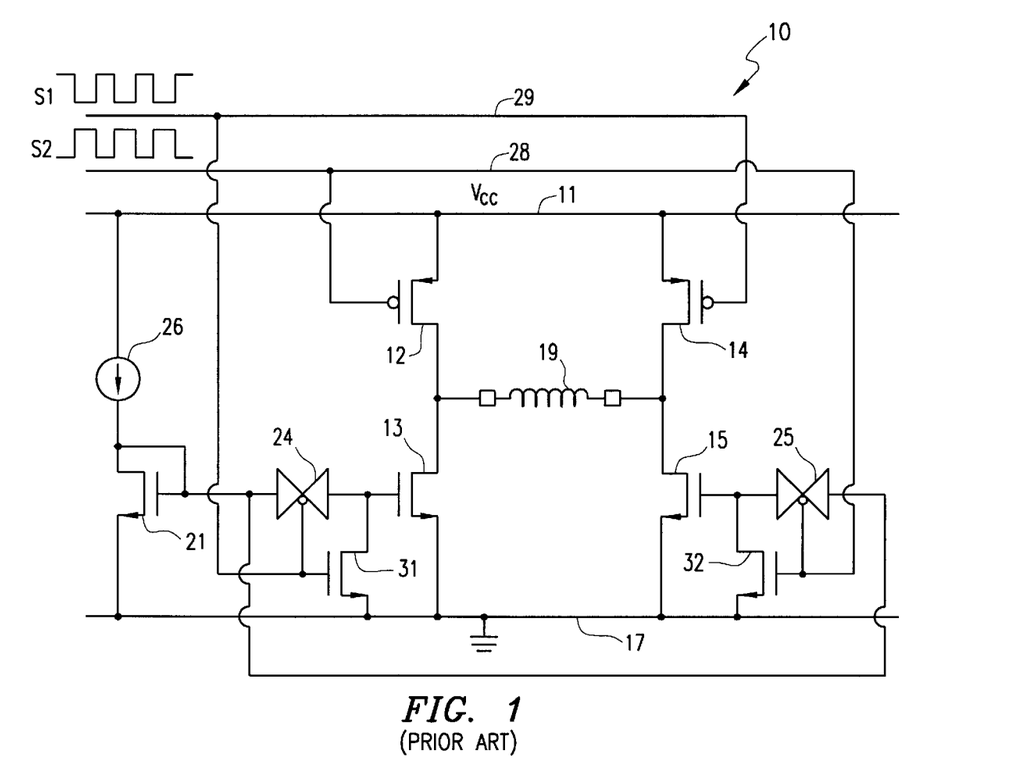
FIG. 1 illustrates a schematic diagram of a conventional H-bridge driver circuit for a write head of a disk storage device.

An example of a typical H-bridge write head data driving circuit 10, according to the prior art, is shown in FIG. 1. The circuit 10 includes four MOS transistors, 12–15 connected between a $V_{cc}$ voltage 11 and ground reference 17. A coil 19, used, for example, to supply data pulses for writing to a disk drive media is integrated into the write head mechanism. The coil 19 is connected between the center legs of the H-bridge, as shown.

It can been seen that, depending on the gate biases applied to the respective transistors 12–15, the current flows through the coil 19 in one direction or another. That is, one current flow path includes the transistor 14, coil 19 from right to left, and transistor 13. The other current flow path includes transistor 12, the coil 19 from left to right, and the transistor 15.

In the H-bridge circuit 10, the transistor 12 and 14 serve as switching transistors, which are controlled by the out-of-phase signals on a pair of respective input lines 28 and 29. The transistors 13 and 15 serve as current controlling transistors, which are controlled by the out-of-phase signals on the respective input lines 29 and 28 in a manner opposite from the connections to the switching transistors 12 and 14, via respective control transistors 31 and 32. The magnitude of the current through the transistors 13 and 15 is controlled by a transistor 21, with which the transistors 13 and 15 form respective current mirrors, when connected via respective transmission gates 24 and 25. The transmission gates 24 and 25 are controlled by the signals on the respective input lines 29 and 28, in the same manner as the associated transistors 31 and 32. A reference current source 26 supplies the reference current to the transistor 21, which is mirrored by currents in respective transistors 13 and 15, as described above.

Thus, the data drive signals supplied to the head mechanism associated with the circuit 10 may be controlled by applying appropriate signals to the input lines 28 and 29. However, as mentioned, as data rates increase, the rates at which the heads can accurately write the data to the magnetic media is limited by the speed at which the flux in the coil 19 (and its associated components) can be reversed. The maximum data rate is thus limited to the maximum physical flux reversal rate of the driver circuitry.

What is needed, therefore, is a method and circuit for driving an inductive load of the type used in conjunction with a write head of a disk drive with a signal that enables a maximum flux reversal rate in the driver coil.

SUMMARY OF THE INVENTION

The present invention overcomes the shortcomings in prior systems and thereby satisfies a significant need for a driver circuit for the write head of a disk storage device. The driver circuit provides a current to the write head so that current flows through the write head in one direction or the other. The driver circuit includes a pair of identical sub-circuits, each sub-circuit being connected to a distinct terminal of the write head. Each driver sub-circuit forms a leg of an H-bridge driver circuit.

Each driver sub-circuit includes a pull-up and/or switching device having a first terminal connected to a voltage supply and a second terminal coupled to the corresponding write head terminal. The driver sub-circuit further includes first and second current sink circuits coupled to the terminal of the write head in parallel relation to each other. The first and second current sink circuits are each capable of sinking current from the corresponding terminal of the write head. The driver circuit further includes a control circuit connected to the pull-up device and the first and second current sink circuits of each driver sub-circuit, for controlling current flow through the write head so as to write data on a corresponding magnetic storage disk.

In general terms, the control circuit activates the pull-up device of one driver sub-circuit so as to provide a current to one terminal of the write head, while activating the first current sink circuit of the other driver sub-circuit in order to sink the provided current from the other terminal of the write head. In this way, the control circuit is capable of passing a predetermined current level through the write head in either direction as desired to write data on the storage disk.

As stated above, it is desirous for H-bridge driver circuits to cause the current flowing through the write head to relatively quickly switch directions. In order to lessen the transition time between the current flowing through the write head in one direction and current flowing therethrough in the opposite direction, the control circuit activates the appropriate first current sink circuit as well as the corresponding second current sink circuit during the current transition. The activation of both first and second current sink circuits causes the current passing through the write head to quickly ramp towards the destination intended current level. The second current sink circuit is activated by the control circuit until the current level in the write head approximately reaches the intended current level. The control circuit thereupon deactivates the second current sink circuit so as to limit the overshoot of current flowing through the write head. Substantially immediately after the second current sink circuit is deactivated by the control circuit, the pull-up device associated with the same write head terminal is temporarily activated by the control circuit for a predetermined period of time. The activated pull-up device pulls the voltage level appearing at the corresponding write head terminal towards the voltage level appearing on the other write head terminal. At the end of the predetermined period of time, the voltage across the write head is near zero volts, thereby yielding a constant current through the write head at the desired current level. The current flowing through the write head is maintained at approximately the desired current level by the first current sink circuit following deactivation of the activated pull-up device. In this way, the time associated with reversing current through the write head is minimized without experiencing substantial current overshoot or undershoot relative to the desired destination current level.

According to a preferred embodiment of the present invention, each driver sub-circuit includes a first protection transistor connected in series between the pull-up device and the corresponding terminal of the write head, and a second protection transistor connected in series between the corresponding write head terminal and the first and second current sink circuits. For each protection transistor, the control terminal is tied to a fixed voltage so that a finite on resistance is created between the two current conducting terminals of the protection transistor. The voltage swings or voltage differentials appearing at the terminals of the pull-up devices and at the terminals of the transistors in the current sink circuits are reduced. The reduced voltage swing of the pull-up devices and the current sink circuits allows for the pull-up devices and current sink circuits to be implemented with low voltage transistors having lower breakdown voltages, which results in increased current performance.

BRIEF DESCRIPTION OF THE DRAWINGS

A more complete understanding of the system and method of the present invention may be obtained by reference to the following Detailed Description when taken in conjunction with the accompanying Drawings wherein.

DETAILED DESCRIPTION OF THE PREFERRED EXEMPLARY EMBODIMENTS

Figure 2:
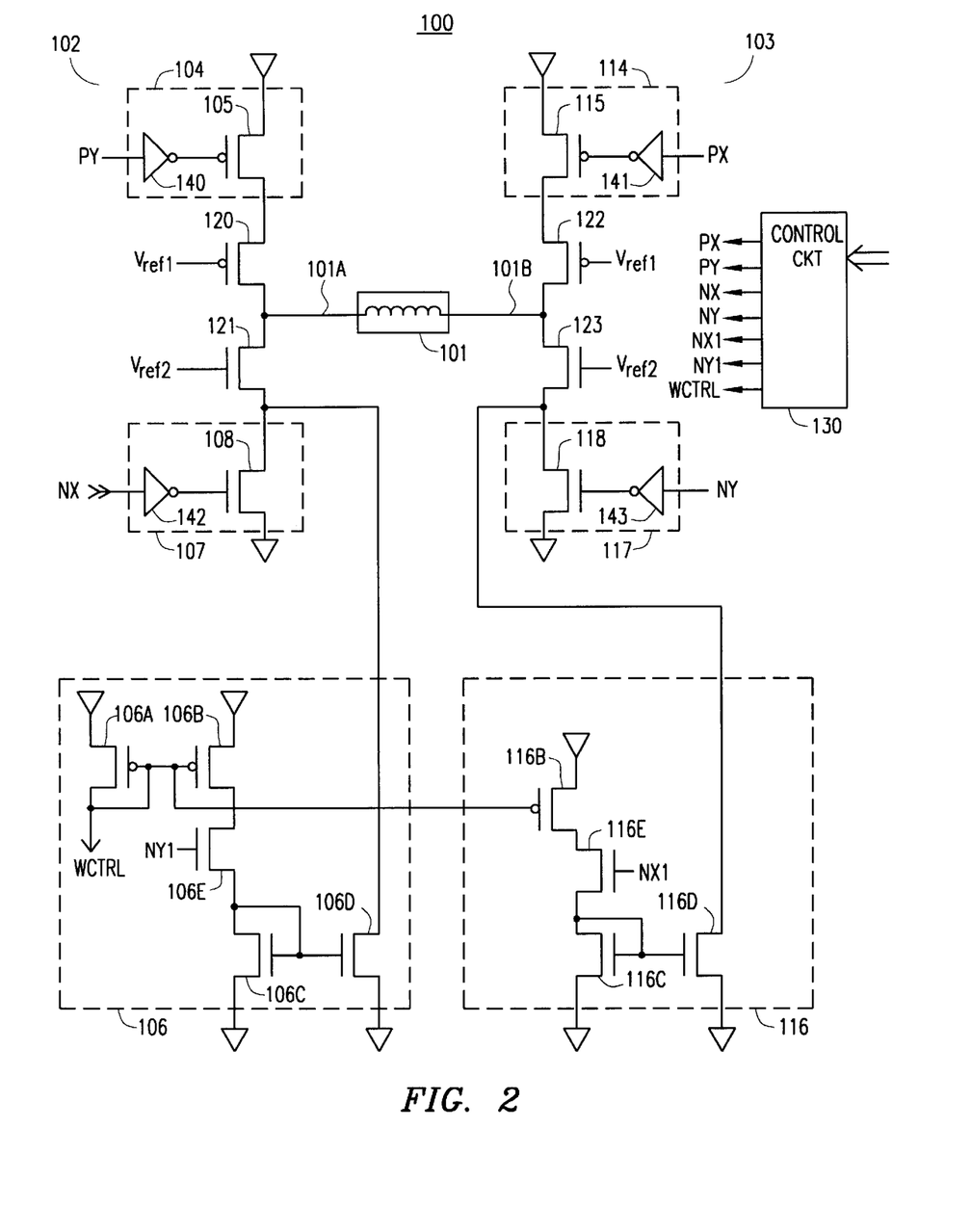
FIG. 2 illustrates a schematic diagram of a driver circuit for a write head of a disk storage device according to a preferred embodiment of the present invention.

Referring to FIG. 2, there is shown a driver circuit 100 for driving the write head 101 of a magnetic disk storage device. Driver circuit 100 is implemented as an H-bridge circuit wherein current is provided to write head 101 through selected legs of driver circuit 100 for writing data onto an associated magnetic storage disk.

Driver circuit 100 includes a pair of identical sub-circuits 102 and 103, each of which is associated with a distinct terminal of write head 101. Sub-circuit 102 supplies a current to and sinks a current from write head 101 through terminal 101A thereof. Similarly, sub-circuit 103 supplies a current to and sinks a current from write head 101 through terminal 101B thereof. In this way, simultaneously controlling sub-circuits 102 and 103 provides a current through write head 101 having the desired current level and direction.

Sub-circuit 102 of driver circuit 100 includes a pull-up device 104 connected between terminal 101A of write head 101 and a high reference voltage, Vdd. In a preferred embodiment of the present invention, pull-up device 104 is implemented as a p-channel transistor 105 having a source terminal connected to Vdd and a drain terminal coupled to write head terminal 101A. By controlling the gate terminal of the p-channel transistor 105 with a control signal PY, pull-up device 104 serves as a switching transistor in selectively sourcing a current to write head 101 through write head terminal 101A.

Sub-circuit 102 of driver circuit 100 further includes a pair of current sink circuits for selectively sinking current from write head 101 through write head terminal 101A. Specifically, sub-circuit 102 includes a first current sink circuit 106 which is coupled to write head terminal 101A. First current sink circuit 106 includes a first current mirror formed by transistors 106A and 106B. Transistor 106A is enabled by a current source being drawing current from the drain of transistor 106A. The current passing through transistor 106A is mirrored in transistor 106B. First current sink circuit 106 includes a second current mirror formed by transistors 106C and 106D. The drain terminal of transistor 106B is coupled to the drain terminal of transistor 106C such that the current passing through transistor 106B passes through 106C and is mirrored in 106D. Control transistor 106E, having a gate terminal driven by a control signal NY1, is connected in series between transistors 106B and 106C to control the flow and/or mirroring of current between the two current mirrors.

Sub-circuit 102 of driver circuit 100 further includes a second current sink circuit 107 which is connected in parallel with first current sink circuit 106. Second current sink circuit 107 includes a transistor 108 having a drain terminal coupled to write head terminal 101A and a source terminal tied to a ground potential. The gate terminal of transistor 108 is driven by a control signal NX so that second current sink 107 is activated only during a select period of time, as described below. In a preferred embodiment of the present invention, transistor 108 is sized so that when activated, there is a substantially low on resistance ("$R_{ON}$") between the drain and source terminals of transistor 108. In this way, second current sink circuit 107 performs as a switch in sinking a relatively large amount of current when activated.

Because sub-circuit 103 of driver circuit 100 is identical to sub-circuit 102, sub-circuit 103 includes a pull-up device 114 having p-channel transistor 115 connected between Vdd and write head terminal 101B. The gate terminal of transistor 115 is driven by a control signal PX and transistor 115 is sized so that pull-up device 114 serves as a switching transistor that provides current to write head 101. Sub-circuit 103 further includes a first current sink circuit 116 having a first current mirror circuit defined by transistors 106A and 116B, a second current mirror circuit defined by transistors 116C and 116D, and control transistor 116E having its gate terminal driven by a control signal NX1 so as to control the current flowing between the two current mirror circuits.

Moreover, sub-circuit 103 includes second current sink 117 having n-channel transistor 118 tied between write head terminal 101B and ground. The gate terminal of transistor 118 of second current sink circuit 117 is driven by a control signal NY.

Transistor 118 is sized to provide a relatively low on resistance between the drain and source thereof. In this way, transistor 118 acts as a switching transistor in sinking a relatively large amount of current when activated.

FIG. 2 shows sub-circuits 102 and 103 implemented with both n-channel and p-channel MOS transistors. It is understood that the sub-circuits 102 and 103, and particularly first current sink circuits 106 and 116 and second current sink circuits 107 and 117, may be implemented with p-channel MOS transistors, n-channel MOS transistors and/or other types of transistors.

Because existing driver circuits are typically powered by relatively higher power supplies, such as 8v, 10v and 12v power supplies, transistors in existing driver circuits have been implemented as high voltage MOS transistors having relatively high breakdown voltages. High voltage MOS transistors are, among other things, more expensive to fabricate and integrate with low voltage MOS transistors having lower breakdown voltages, and are slower in operation due to the relative size of the parasitic components associated with high voltage MOS transistors. To improve the performance and lower the cost associated with controlling write head 101, driver circuit 100 of a preferred embodiment of the present invention includes components which eliminate the need for using high voltage transistors, by protecting the maximum voltage swings or voltage differentials appearing across each transistor.

Specifically, driver sub-circuit 102 includes a p-channel "protection" transistor 120 which is connected in series between write head terminal 101A and pull-up device 104, and an n-channel "protection" transistor 121 which is connected in series between write head terminal 101A and first and second current sink circuits 106 and 107. The gate terminal of each of protection transistors 120 and 121 is biased at intermediate voltages Vref1 and Vref2, respectively, so that a finite on resistance exists between the drain and source terminals thereof. In this way, when pull-up device 104 is activated to provide a current to write head 101 through write head terminal 101A, a non-zero voltage drop appears across protection transistor 120 so that the voltage differentials appearing across the terminals of transistor 105 of pull-up device 104, such as the gate-drain voltage differential of transistor 105, is reduced. Similarly, when first current sink circuit 106 (and/or second current sink circuit 107) is activated to sink a current from write head 101 through write head terminal 101A, a non-zero voltage drop appears across protection transistor 121 so that the voltage differentials appearing across the terminals of transistor 106D (and/or transistor 108) of first current sink circuit 106 (second current sink circuit 107), such as the gate-drain voltage differential of transistor 106D (transistor 108), is reduced. The reduction in the voltage differentials across the terminals of transistor 105 of pull-up device 104, transistor 106D of first current sink circuit 106, and transistor 108 of second current sink circuit 107 allow for transistors 105, 106D and 108 to have a thinner gate oxide and thereby possess improved operating characteristics without experiencing a breakdown condition.

Because sub-circuit 103 is identical to sub-circuit 102, sub-circuit 103 includes p-channel protection transistor 122 connected in series between pull-up device 114 and write head terminal 101B, and n-channel protection transistor 123 connected in series between write head terminal 101B and first and second current sink circuits 116 and 117. As explained above with respect to protection transistors 120 and 121, protection transistor 122 reduces the voltage differentials appearing across the terminals of transistor 115 of pull-up device 114, and protection transistor 123 reduces the voltage differentials appearing across the terminals of transistor 116D of first current sink circuit 116 and transistor 118 of second current sink circuit 117. Consequently, transistors 115, 116D and 118 may each possess a thinner gate oxide thickness and thereby achieve enhanced operating characteristics without experiencing breakdown conditions.

It is understood that the specified bias applied to the gate terminal of and the size of each protection transistor 120–123 depends upon the desired operating characteristics of driver circuit 100, such as the power supply voltage Vdd, the desired gate oxide thicknesses for transistors 105, 106D, 108, 115, 116D and 118, the desired data rate, and the desired power dissipation. One preferred embodiment of the present invention may determine the gate terminal bias and the size for protection transistors 120–123 based upon a predetermined supply voltage Vdd and upon each transistor in driver circuit 100 having the same gate oxide thickness.

According to a preferred embodiment of the present invention, driver circuit 100 further includes a control circuit 130 for generating signals that control the activation of pull-up devices 104 and 114, first current sink circuits 106 and 116 and second current sink circuits 107 and 117. Control circuit 130 may form a portion of the circuitry located in a controller for a disk storage device in which driver circuit 100 may be disposed. Alternatively, control circuit 130 is instead separate from the controller and receives as its input signals generated thereby.

Control circuit 130 generates control signal PY which drives the gate terminal of transistor 105 of pull-up device 104 through an inverter 140; control signal PX which drives the gate terminal of transistor 115 of pull-up device 114 through inverter 141; control signal NY1 which drives the gate terminal of transistor 106E of first current sink circuit 106; and control signal NX1 which drives the gate terminal of transistor 116E of first current sink circuit 116. In addition, control circuit 130 generates control signal NX which drives the gate terminal of transistor 108 of second current sink 107 through inverter 142, and control signal NY which drives the gate terminal of transistor 118 of second current sink circuit 117 through inverter 143.

In general terms, control circuit 130 activates pull-up device 104 of driver sub-circuit 102 and first current sink circuit 116 of driver sub-circuit 103 in order for a predetermined current level to flow through write head 101 in a first direction (from write head terminal 101A to write head terminal 101B as shown in FIG. 2). Likewise, control circuit 130 activates pull-up device 114 of driver sub-circuit 103 and first current sink circuit 106 of driver sub-circuit 102 in order for a predetermined current level to flow through write head 101 in a second direction (from write head terminal 101B to write head terminal 101A as shown in FIG. 2). In writing data onto a magnetic storage disk, control circuit 130 switches between activating pull-up device 104 and first current sink circuit 116 and activating pull-up device 114 and first current sink circuit 106.

As stated above, it is desirous to be able to quickly reverse the direction of current flowing through write head 101 in order to reduce the rate at which data can be written onto a magnetic storage disk. During the time the current flowing through write head 101 transitions between the two current levels, control circuit 130 activates one of second current sink circuits 107 and 117. In particular, when control circuit 130 activates a first current sink circuit so as to sink current from write head 101, control circuit 130 activates the second current sink circuit associated therewith. Activation of a first current sink circuit and the second current sink circuit associated therewith increases the amount of current drawn from write head 101 through the corresponding write head terminal. As a result of a first current sink circuit and corresponding second current sink circuit being simultaneously activated, the corresponding write head terminal is relatively quickly pulled towards ground, causing a relatively large voltage across write head 101. Consequently, the rise and fall times of the current signal passing through write head 101 are substantially reduced.

Due to the increase in current being drawn from write head 101 through the parallel combination of the first and second current sink circuits, the current passing through write head 101 will have a greater tendency to overshoot the destination or final steady state current level (i.e., the steady state current level in write head 101 following the reversal of current direction). In order to reduce the overshoot of the current signal passing through write head 101, control circuit 130 deactivates the previously-activated second current sink circuit when the current passing through write head 101 relatively slightly surpasses the destination steady state current level. In this way, the overshoot of current passing through write head 101 is reduced.

Although the deactivation of the activated second current sink circuit reduces current overshoot through write head 101, an unacceptable amount of current overshoot and undershoot may nonetheless occur relative to the destination steady state current level. In addition to deactivating the second current sink circuit, control circuit 130 thereafter temporarily activates a pull-up device 104 or 114 associated with the deactivated second current sink circuit to pull the corresponding write head terminal 101A or 101B towards the voltage appearing at the other write head terminal until the voltage across write head 101 is approximately zero volts. Without a voltage drop across write head 101 and noting that write head 101 may be modeled as an inductance, the current flowing through write head 101 is substantially constant at the destination steady state current level. As a result, the temporary activation of pull-up device 104 or 114 following the deactivation of the corresponding second current sink circuit 107 117 forces the current flowing through write head 101 to relatively rapidly approach the destination steady state current level without an appreciable overshoot or undershoot.

As stated above, control circuit 130 activates second current sink circuits 107 and 117 for the time period during which the current level flowing through write head 101 transitions between two steady state current levels. Because the operating characteristics of write head 101 may vary considerably, the activation time for second current sink circuits 107 and 117 is preferably programmable. In the same way, the time period of temporary activation of pull-up devices 104 and 114 immediately following the respective activation of second current sink circuits 107 and 117 is programmable.

Figure 6:
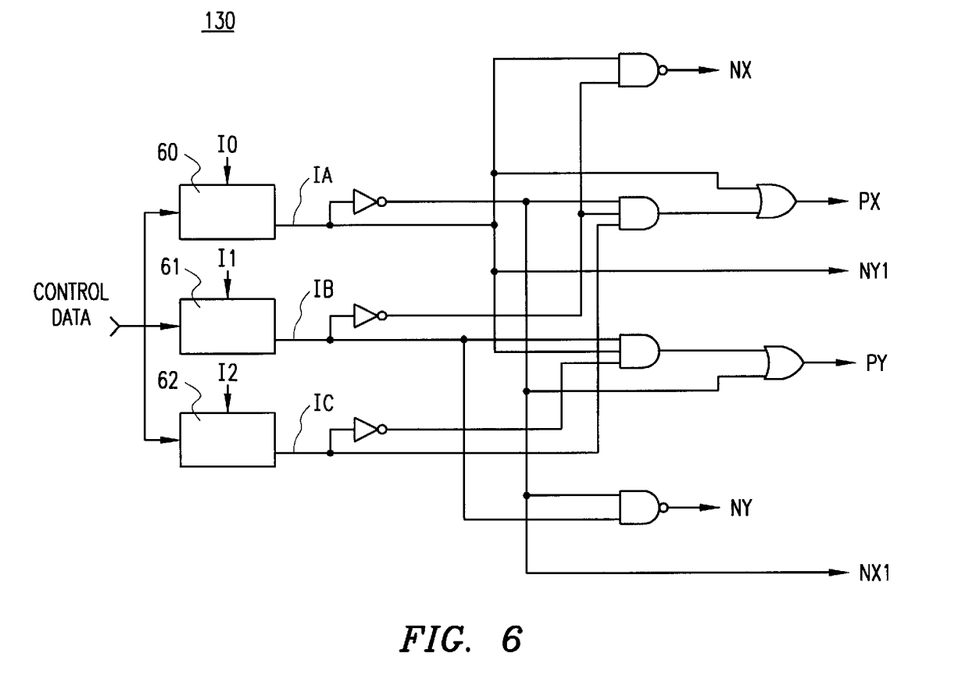
FIG. 6 is a schematic diagram of a timing control circuit according to the preferred embodiments of the present invention.

FIG. 6 illustrates a schematic of control circuit 130 according to a preferred embodiment of the present invention. Control circuit 130 includes three delay elements 60–62 which respectively generate intermediate signals IA-IC. Each delay element 60–62 has an first input whose logical value is provided at the delay element output a period of time later based upon the amount of current provided at the second input of the delay element. In this case, the first inputs of delay element 60–62 are tied to a single control signal. Assuming comparable delays through the logic paths, the difference in the amount of current provided to delay elements 60 and 61 determines the amount of time second current sink circuits 107 and 117 are activated, and the difference in the amount of current provided to delay elements 61 and 62 determines the amount of time pull-up devices 104 and 114 are temporarily activated following the activation of second current sink circuits 107 and 117. In this case, the second input of each delay element 60–62 is controllable.

Figure 7:
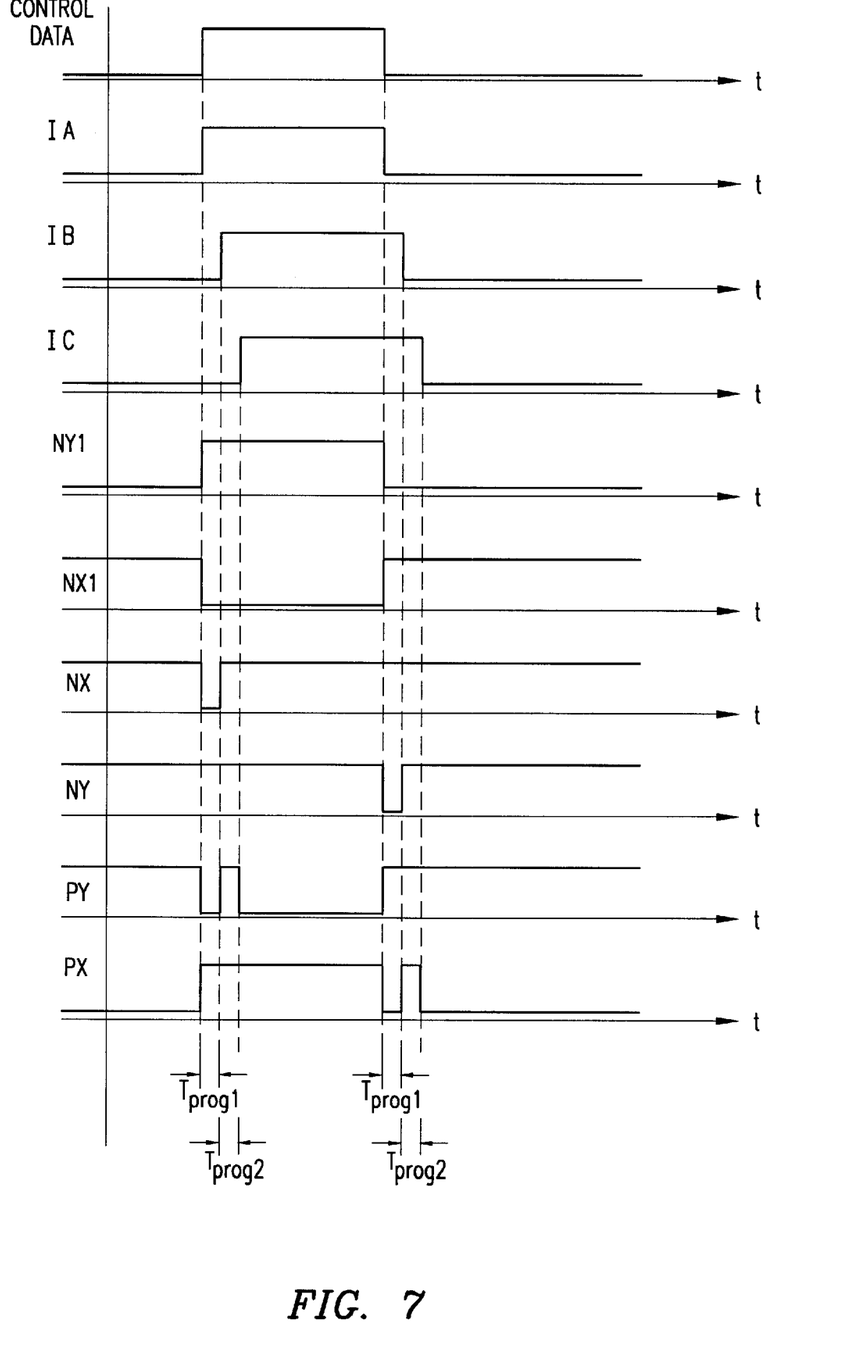
FIG. 7 illustrates the timing relationship for the signals generated by the control circuit shown in FIG. 6.

Control circuit 130 further includes combinational logic 63 which receives intermediate signals IA-IC and generates the control signals PX, PY, NX, NY, NX1 and NY1 based thereupon. FIG. 7 illustrates the timing relationship between the control signal provided to delay elements 60–62 and control signals PX, PY, NX, NY, NX1 and NY1.

The operation of driver circuit 100 according to a preferred embodiment of the present invention will be described with reference to FIG. 3. In this example, current flowing through write head 101 from write head terminal 101B to write head terminal 101A is considered a positive current direction, and current flowing in the opposite direction is considered a negative current direction. It is assumed that control circuit 130 has been programmed to activate second current sink circuits 107 and 117 for a predetermined period of time, Tprog1, so that second current sink circuits 107 and 117 are deactivated prior to the current in write head 101 overshooting the destination steady state current level. Similarly, it is assumed that control circuit 130 had been programmed so that pull-up devices 104 and 114 are activated for a predetermined period of time Tprog2 following the activation of second current sink circuits 107 and 117, respectively.

At time T0, control circuit 130 applies a current source to the drain of transistor 106A to enable the current mirrors formed by transistors 106A and 106B and by 106A and 116B. Write head 101 is driven by driver circuit 100 to pass a negative steady state current level therethrough. In particular, control circuit 130 drives control signal PY to a high logic level so that the gate terminal of pull-up transistor 105 is at a low logic level, which enables pull-up transistor 105 to source current to write head 101 through write head terminal 101A. Control circuit 130 drives control signal NX1 to a high logic level so that transistor 116E is turned on and first current sink circuit 116 is enabled to draw current from write head 101 through write head terminal 101B. Conversely, control circuit 130 drives control signals PX and NY1 at time T0 to a low logic level so that pull-up device 114 and first current sink circuit 106 are respectively disabled. Second current sink circuits 107 and 117 are disabled at time T0 by control circuit 130 driving control signals NX and NY to a high logic level. Consequently, a steady state negative current level, -Iss, flows through head 101 at time T0.

At time T1, driver circuit 100 initiates the reversal of current flow through write head 101. Control signals PY and NX1 are driven to a low logic level by control circuit 130 to respectively deactivate (turn off) pull-up device 104 and first current sink circuit 116. Control circuit 130 also drives control signals PX and NY1 to a high logic level at time T1 so that pull-up device 114 and first current sink circuit 106 are activated, respectively. Consequently, the path of current flow changes at time T1 from an initial path including pull-up device 104 and first current sink circuit 116 to a path including pull-up device 114 and first current sink circuit 106.

Further, control circuit 130 drives control signal NX to a low logic level at time T1 which enables second current sink circuit 107 to sink current from write head 101 in parallel with first current sink circuit 106. As discussed above, with both first current sink circuit 106 and second current sink circuit 107 being activated, write head terminal 101A is quickly pulled towards the ground potential and a relatively sizeable amount of current is drawn from write head 101 through write head terminal 101A. The voltage differential across write head 101 is relatively large shortly after time T1. From time T1, the current passing through write head 101 increases at a substantial rate towards a positive current level.

At time T1+Tprog1, a programmable period of time Tprog1 following time T1 and around the time the current level through write head 101 relatively slightly surpasses the destination steady state current level, Iss, control circuit 103 deactivates second current sink circuit 107 by control signal NX transitioning to a low logic level, which prevents second current sink circuit 107 from further drawing current from write head 101. Programmable period of time Tprog1 is generated based upon the input signals applied to control circuit 130. At the same time T1+Tprog1, control circuit 130 drives control signal PY to a logic high level to temporarily activate pull-up device 104 so as to pull write head terminal 101A towards the high reference voltage level Vdd and particularly towards the voltage appearing on write head terminal 101B. As the voltage across write head 101 approaches zero, the current through write head 101 approaches a substantially constant current at the destination steady state current level Iss. The combination of second current sink circuit 107 turning off and pull-up device 104 turning on hastens write head 101 and driver circuit 100 to pass the destination steady state current level Iss through write head 101.

At time T1+Tprog1+Tprog2, the current in write head 101 has approximately reached the destination steady state current level Iss. At this time, control circuit 130 drives control signal PY to a logic low state which deactivates pull-up transistor 104. After pull-up device 104 is deactivated, the current level passing through write head 101 undergoes relatively minor variations (overshoot and/or undershoot relative to destination steady state current level Iss) until driver circuit 100 and write head 101 reach the destination steady state condition.

Figure 3:
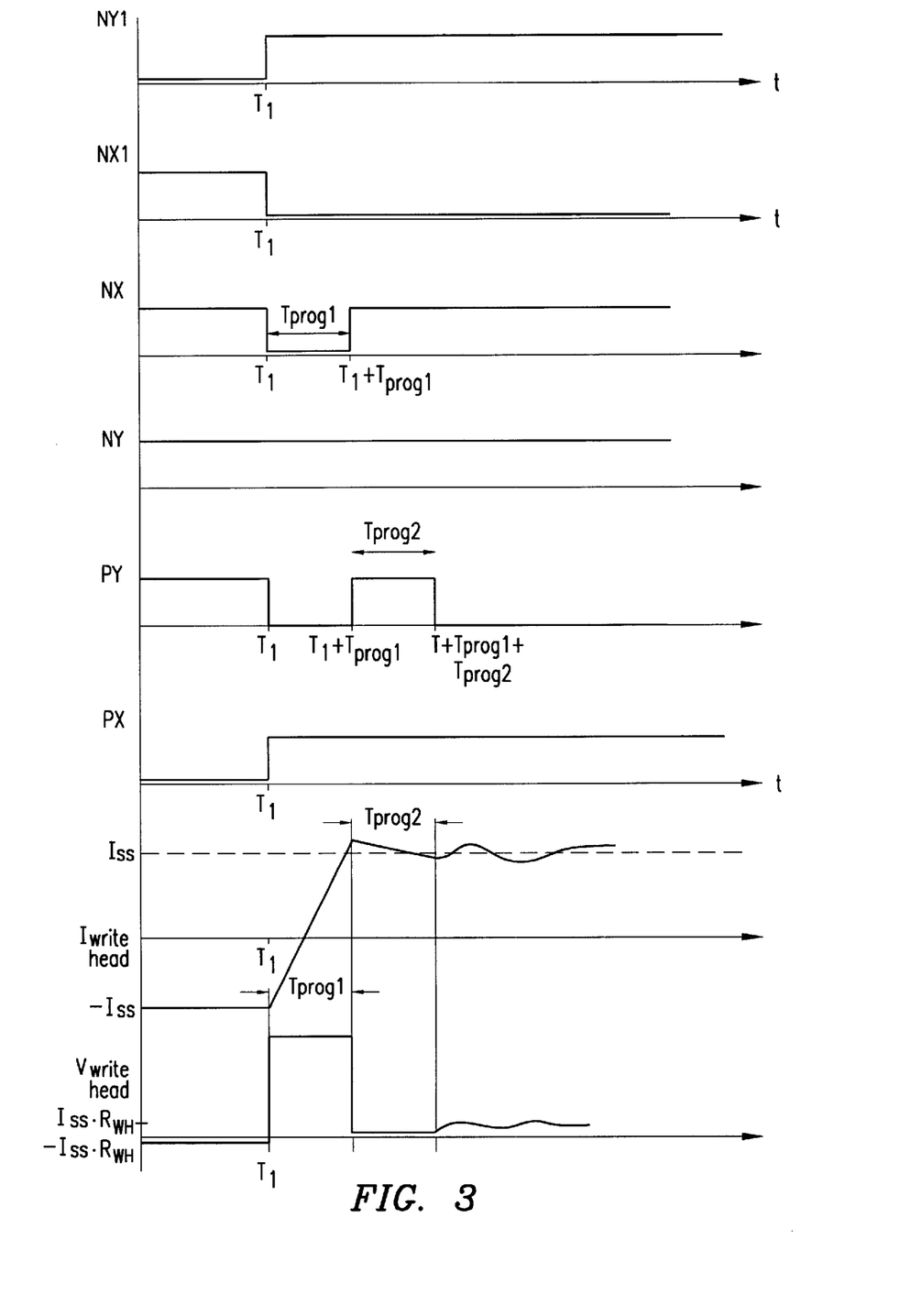
FIG. 3 illustrates a timing diagram corresponding to the operation of the driver circuit shown in FIG. 2.

It is noted that the waveforms of write head 101 in FIG. 3 show that the write head current slightly decreases between times T1+Tprog1 and T1+Tprog1+Tprog2, and that the voltage across write head 101 is slightly above zero volts between times T1+Tprog1 and T1+Tprog1+Tprog2. These waveform characteristics are due in part to write head 101 not completely following the behavior of an inductance.

It is understood that driver circuit 100 and write head 101 operate in a symmetrical manner to the above-described operation when driver circuit 100 causes the current flowing through write head 101 to reverse direction from the steady state current level Iss to the steady state current level -Iss. Accordingly, such current direction reversal will not be described.

It is understood that because write head driver circuits may utilize relatively higher voltage power supplies, such as 10v and 12v power supplies, portions of driver circuit 100 may be connected to different reference voltage levels. For instance, in the event driver circuit 100 utilizes an 8v–12v power supply, first current sink circuits 106 and 116 and second current sink circuits 107 and 117 may be connected between a first intermediate reference voltage, such as 5v, and ground. In this case, pull-up devices 104 and 114 may be connected between the 8v–12v supply voltage and a second intermediate reference voltage, such as 3v.

As described above, control circuit 130 activates pull-up devices 104 and 114 to primarily control the sourcing of current to write head 101. As explained above, control circuit 130 of driver circuit 100 also temporarily activates pull-up devices 104 and 114 for a predetermined period of time Tprog2 immediately following the respective deactivation of second current sink circuits 107 and 117 in order to reduce the switching time of driver circuit 100. It is understood that control circuit 130 may activate other pull-up devices during the temporary, predetermined time period instead of activating pull-up devices 104 and 114.

Figure 4:
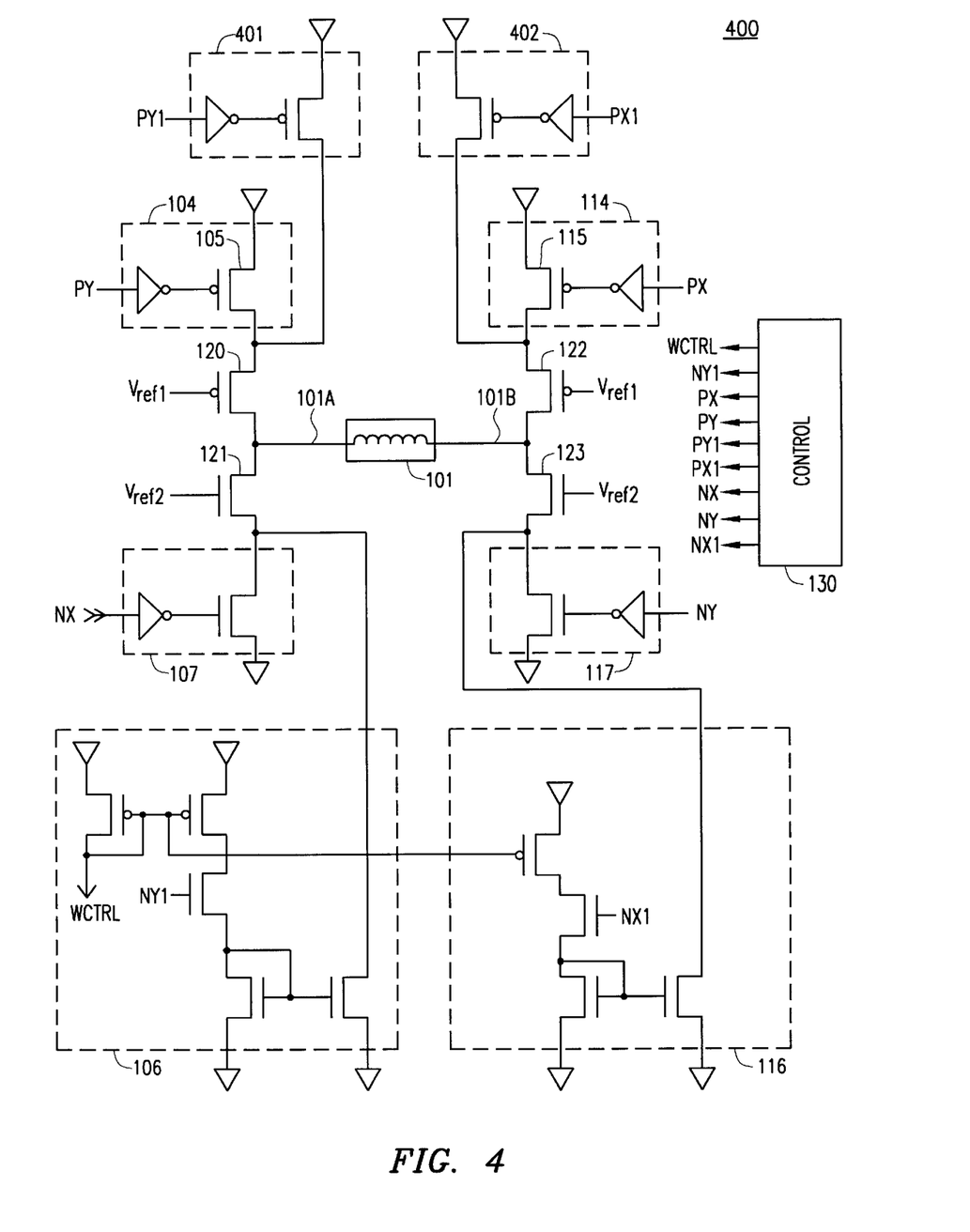
FIG. 4 illustrates a schematic diagram of a driver circuit for a write head of a disk storage device according to another preferred embodiment of the present invention.

Referring to FIG. 4, there is shown a driver circuit 400 according to a second preferred embodiment of the present invention. Driver circuit 400 includes the sub-circuits 102 and 103 as described above and illustrated in FIG. 2. In addition, driver sub-circuits 102 and 103 respectively include second pull-up devices 401 and 402. Second pull-up device 401 is connected in parallel with pull-up device 104 and is enabled to source current to write head 101 upon assertion of control signal PY1. Similarly, second pull-up device 402 is connected in parallel with pull-up device 114 and is enabled to source current to write head 101 upon assertion of control signal PX1. Both pull-up devices 401 and 402 may be each implemented using a p-channel pull-up transistor having a gate terminal that is driven by a control signal via an inverter circuit.

Figure 5:
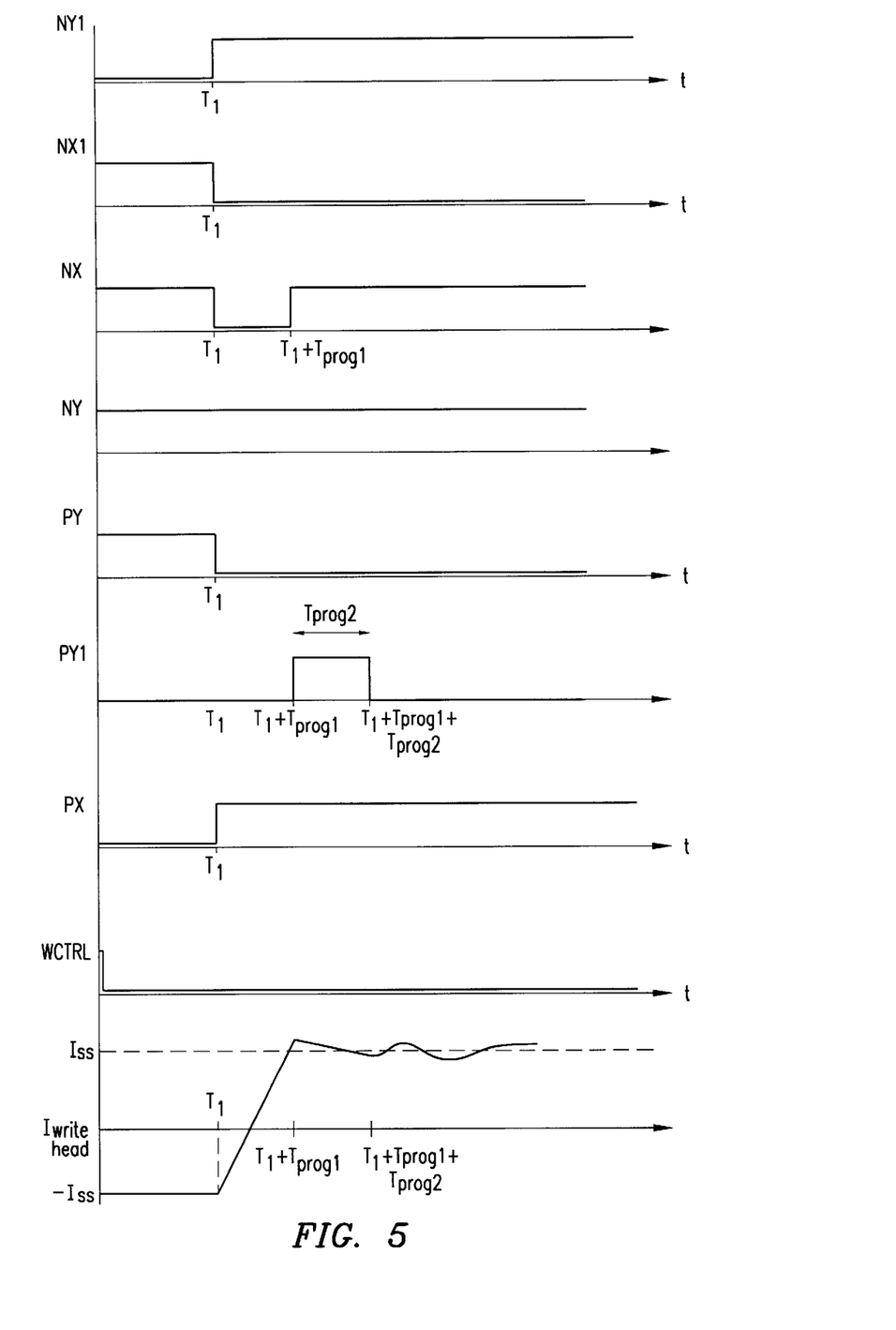
FIG. 5 is a timing diagram of an operation of the driver circuit shown in FIG. 4.

In this second embodiment, control circuit 130 activates pull-up devices 104 and 114 to serve as switching transistors in an H-bridge configuration in providing current to write head 101. In addition, control circuit 130 activates pull-up devices 401 and 402 during the temporary time period Tprog2 in order to quickly force the voltage appearing across write head 101 towards zero, thereby reducing current overshoot and undershoot during current reversals in write head 101. A timing diagram of an operation of drive circuit 400 is shown in FIG. 5, in which the timing previously utilized in generating control signals PY and PX is respectively divided among the control signals PY and PY1, and among the control signals PX and PX1. The remaining timing signals in FIG. 5 are as shown in FIG. 3 and will not be repeated for reasons of simplicity.

One benefit of drive circuit 400 over drive circuit 100 is that by having two pairs of pull-up devices, current may be provided to write head 101 at two distinct amounts. For example, one current level may be provided by pull-up devices 104 and 114 and another current level may be provided by pull-up devices 401 and 402. Flexibility in performance is increased as a result.

The invention being thus described, it will be obvious that the same may be varied in many ways. Such variations are not to be regarded as a departure from the spirit and scope of the invention, and all such modifications as would be obvious to one skilled in the art are-intended to be included within the scope of the following claims.

What is claimed is:

1. A driver circuit for the write head of a disk storage device, comprising:
    a first pull-up device, the pull-up device being selectively coupled to a high reference voltage level and activated to provide a current to a first terminal of the write head, the pull-up device comprising a first pull-up transistor;
    a first transistor connected in series between the first pull-up device and the first terminal of the write head, the first transistor having a control terminal that is biased at a first voltage to provide a non-zero, finite voltage differential between the first terminal of the write head and the first pull-up device;
    a pull-down transistor coupled between the first terminal of the write head and a low reference voltage level, the pull down transistor being selectively activated to sink current from the write head;
    a second transistor connected in series between the first terminal of the write head and the current sink, the second transistor having a control terminal that is biased at a second voltage different from the first voltage to provide a non-zero, finite voltage differential between the first terminal of the write head and the pull-down transistor; and
    a circuit coupled to a second terminal of the write head for sinking current from the write head approximately when the first pull-up device is activated, and sourcing a current to the write head approximately when the pull-down transistor is activated.

2. The driver circuit of claim 1, wherein:
    the current sink comprises a first current sink and a second current sink connected in parallel relation with the first current sink; and
    the driver circuit further comprises a control circuit connected to the first pull-up device and the first and second current sinks, the control circuit independently activating the first and second current sinks relative to each other.

3. The driver circuit of claim 2, wherein:
    control circuit activates the first and second current sinks at substantially the same time, and deactivates the second current sink prior to deactivating the first current sink.

4. The driver circuit of claim 3, wherein:
    the control circuit activates the second current source when current through the write head is transitioning between substantially steady state current levels, and activates the first current sink when current through the write head is transitioning between the substantially steady state current levels and when one of the steady state current levels flows through the write head.

5. The driver circuit of claim 1, wherein:
    the first pull-up device includes a second transistor connected between the first transistor and a reference voltage source;
    the at least one current sink includes a plurality of third transistors; and
    the first transistor, second transistor and third transistors have substantially the same gate oxide thickness.

6. The driver circuit of claim 1, wherein:
    the first pull-up device includes a second transistor connected between the first transistor and a reference voltage source;
    the at least one current sink includes a plurality of third transistors; and
    the first transistor, second transistor and third transistors have the same breakdown voltage.

7. A driver circuit for the write head of a disk storage device, comprising:
    a first pull-up device, the first pull-up device being selectively activated to provide a current to a first terminal of the write head;
    a first transistor connected in series between the first pull-up device and the first terminal of the write head, the first transistor having a control terminal that is biased at a first voltage to provide a non-zero voltage differential between the first terminal of the write head and the first pull-up device;
    at least one first pull-down device coupled to the first terminal of the write head, the at least one first pull-down device being selectively activated to sink current from the first terminal of the write head;
    a second transistor connected in series between the first pull-down device and the first terminal of the write head, the second transistor having a control terminal that is biased at a second voltage different from the first voltage to provide a non-zero voltage differential between the first terminal of the write head and the first pull-down device; and
    a circuit coupled to a second terminal of the write head for sourcing current to the write head approximately when the first pull-down device is activated, and sinking a current from the write head approximately when the first pull-down device is deactivated.

8. The driver circuit of claim 7, wherein:
    control terminals of the first and second transistor are biased at a substantially constant voltage level.

9. The driver circuit of claim 7, wherein:
    the first pull-down device comprises at least one field effect transistor;
    the first pull-up device comprises at least one field effect transistor; and
    the first transistor, second transistor and the transistors in the first pull-down device and first pull-up device have gate dielectrics that are thinner than gate dielectrics in high voltage transistors having relatively high breakdown voltages.

10. The driver circuit of claim 7, wherein the circuit comprises:
    a second pull-up device selectively activated to provide a current to the second terminal of the write head; and a third transistor connected in series between the second pull-up device and the second terminal of the write head, the third transistor having a control terminal that is biased to provide a voltage differential between the second terminal of the write head and the second pull-up device.

11. The driver circuit of claim 7, wherein the circuit comprises:

at least one second pull-down device coupled to the second terminal of the write head, the at least one second pull-down device being selectively activated to sink current from the second terminal of the write head; and a third transistor connected in series between the second pull-down device and the second terminal of the write head, the third transistor having a control terminal that is biased to provide a voltage differential between the second terminal of the write head and the second pull-down device.

12. A method of controlling the write head of a disk storage device, comprising the steps of:

sourcing a current from a power supply to a first terminal of the write head and sinking a current from a second terminal thereof so that current flows through the write head at a first current level, the step of sourcing a current to the first terminal including maintaining a finite, non-zero voltage drop between the power supply and the first terminal;

sourcing current from the power supply through the second terminal of the write head while sinking current from the first terminal of the write head so that the current flowing though the write head transitions from the first current level towards a second current level having an opposite polarity relative to the first current level, the step of sourcing a current to the second terminal including maintaining a finite, non-zero voltage drop between the power supply and the second terminal.

* * * * *

UNITED STATES PATENT AND TRADEMARK OFFICE
CERTIFICATE OF CORRECTION

PATENT NO. : 6,456,148 B2
DATED : September 24, 2002
INVENTOR(S) : Giuseppe Patti et al.

It is certified that error appears in the above-identified patent and that said Letters Patent is hereby corrected as shown below:

<u>Title page,</u>
Item [57], ABSTRACT,
Line 4, replace "write head though" with -- write head through --

<u>Column 12,</u>
Line 50, replace "first and second transistor" with -- first and second transistors --

<u>Column 14,</u>
Line 12, replace "flowing though the" with -- flowing through the --

Signed and Sealed this

Twenty-second Day of July, 2003

JAMES E. ROGAN
*Director of the United States Patent and Trademark Office*